Feb. 21, 1956 W. S. AUSTIN 2,735,529

VARIABLE-RATIO HYDRAULIC TRANSMISSION

Filed March 19, 1951 7 Sheets-Sheet 1

INVENTOR.
WALTER S. AUSTIN
BY HIS ATTORNEYS.
HARRIS, KIECH, FOSTER & HARRIS
BY Clarence F. Kiech Feb. 21, 1956 W. S. AUSTIN 2,735,529

VARIABLE-RATIO HYDRAULIC TRANSMISSION

Filed March 19, 1951 7 Sheets-Sheet 2

INVENTOR.
WALTER S. AUSTIN
BY HIS ATTORNEYS.
HARRIS, KIECH, FOSTER & HARRIS
BY Lorenz F. Kiech Feb. 21, 1956 W. S. AUSTIN 2,735,529

VARIABLE-RATIO HYDRAULIC TRANSMISSION

Filed March 19, 1951 7 Sheets-Sheet 3

INVENTOR.
WALTER S. AUSTIN
BY HIS ATTORNEYS.
HARRIS, KIECH, FOSTER & HARRIS
BY [signature]

INVENTOR.
WALTER S. AUSTIN
BY HIS ATTORNEYS.
HARRIS, KIECH, FOSTER & HARRIS
BY

Feb. 21, 1956 W. S. AUSTIN 2,735,529

VARIABLE-RATIO HYDRAULIC TRANSMISSION

Filed March 19, 1951 7 Sheets-Sheet 5

INVENTOR.
WALTER S. AUSTIN
BY HIS ATTORNEYS.
HARRIS, KIECH, FOSTER & HARRIS
BY

VARIABLE-RATIO HYDRAULIC TRANSMISSION

Filed March 19, 1951 7 Sheets-Sheet 6

INVENTOR.
WALTER S. AUSTIN
BY HIS ATTORNEYS.
HARRIS, KIECH, FOSTER & HARRIS
BY [signature]

VARIABLE-RATIO HYDRAULIC TRANSMISSION

Filed March 19, 1951 7 Sheets-Sheet 7

INVENTOR.
WALTER S. AUSTIN
BY HIS ATTORNEYS.
HARRIS, KIECH, FOSTER & HARRIS
BY

United States Patent Office 2,735,529

Patented Feb. 21, 1956

2,735,529

VARIABLE-RATIO HYDRAULIC TRANSMISSION

Walter S. Austin, Grand Rapids, Mich., assignor of one-third to Ruth A. Austin, Los Angeles, Calif., and one-third to Walter S. Austin, Jr., Grand Rapids, Mich.

Application March 19, 1951, Serial No. 216,428

8 Claims. (Cl. 192—58)

The present invention relates in general to fluid or hydraulic transmissions and, more specifically, to a transmission having driving and driven elements which are adapted to be coupled together by a fluid, preferably a liquid such as oil, for example.

Still more specifically, the present invention relates to a transmission of the foregoing character having means for varying the ratio of the speeds of the driving and driven elements, a primary object of the invention being to provide a variable-ratio hydraulic transmission capable of providing an infinite number of ratios of the speeds of the driving and driven elements. A related object is to provide in a hydraulic transmission of this character a control means for varying the ratio of the speeds of the driving and driven elements which may be actuated either manually or automatically.

As will be apparent, such a transmission finds particular utility in the automotive field, being particularly adaptable to an automobile to vary the ratio of motor speed to road speed. However, while the invention will be considered herein to some extent as applied to an automotive transmission, it will be understood that the invention is not to be limited thereto since it may be employed in any apparatus requiring a variable ratio between the speeds of driving and driven elements.

Considering the present invention in more detail, an important object thereof is to provide a hydraulic transmission which includes nested driving and driven rotors rotatable about a common axis, and which includes means for providing between the rotors an arcuate, circumferentially extending column or piston of liquid for communicating rotary movement of the driving rotor to the driven rotor. More particularly, an object of the invention is to provide nested driving and driven rotors which provide therebetween an arcuate, circumferentially extending space or chamber for an arcuate column of liquid, the driving rotor carrying a pressure-producing wall which is adapted to engage one end of the liquid column, and the driven rotor carrying a pressure-receiving wall which is engageable by the other end of the liquid column so that rotation of the driving rotor is communicated to the driven rotor by the liquid column.

Another object is to provide a driving rotor having a peripheral wall which is concentric with the common axis of rotation of the driving and driven rotors, and to provide a driven rotor having a peripheral wall which is eccentric with respect to the common axis of rotation and which co-operates with said peripheral wall of the driving rotor to provide therebetween an arcuate, circumferentially extending space or chamber having a radial dimension which varies from a maximum value intermediate its ends to minimum values at its ends. As a matter of convenience, such arcuate chamber will be regarded hereinafter as having an inlet end and as having an outlet end spaced circumferentially from the inlet end thereof in the direction of rotation of the driving and driven rotors.

Another object of the invention is to provide a driving rotor which carries a plurality of circumferentially spaced vanes movable generally radially into engagement with the driven rotor and adapted to traverse the arcuate chamber so that they tend to displace the liquid in such chamber from the inlet end thereof toward the outlet end thereof upon rotation of the driving rotor relative to the driven rotor, each of the vanes thus acting as the pressure-producing wall hereinbefore described.

Another object is to provide some means for biasing the vanes carried by the driving rotor into engagement with the peripheral wall of the driven rotor so that each vane acts to displace a column of liquid toward the outlet end of the arcuate chamber between the rotors upon rotation of the driving rotor relative to the driven rotor.

An important object is to provide a by-pass passage which communicates with the outlet end of the arcuate chamber so that the vanes tend to discharge liquid from the arcuate chamber through such passage upon rotation of the driving rotor relative to the driven rotor, and to provide a valve or passage means for controlling the rate of discharge of liquid from the arcuate chamber by way of such passage. With this construction, the position of the valve determines the ratio of the speed of the driving rotor to that of the driven rotor, which is an important feature of the invention.

Another important object is to provide a transmission wherein the aforementioned by-pass passage is formed in the driven rotor and forms part of a by-pass means for connecting the outlet end of the arcuate chamber between the rotors to the inlet end thereof or to the inlet end of another arcuate passage, the valve being carried by the driven rotor and serving to control the rate of such by-passing of the liquid from the outlet end of the arcuate chamber so as to control the ratio of the speed of the driving rotor to that of the driven rotor.

Another object of the invention is to provide such a transmission wherein the driving and driven rotors provide therebetween two or more circumferentially spaced arcuate chambers of the character hereinbefore described, the driven rotor being provided with two or more by-pass passages, each controlled by a valve, for connecting the outlet ends of the arcuate chambers to the inlet ends of adjacent chambers.

Another object is to provide a control means for operating all of the valves in unison, such control means being actuable either automatically or manually.

Another object is to provide such a transmission with rotatable valves of the butterfly type which are unbalanced in such a manner that the action of the columns of liquid in the arcuate chambers thereon tends to rotate them into open positions, such tendency of the valves to rotate into their open positions being opposed by the control means.

An important object of the invention is to provide such a transmission having means for mechanically or otherwise latching selected ones of the vanes in retracted, inoperative positions so as to provide an additional means for varying the ratio of the speeds of the driving and driven elements.

Another object of the invention is to provide such a transmission wherein the driving and driven rotors may be nested in various ways, as by nesting the driven rotor in the driving rotor, or by nesting the driving rotor in the driven rotor, for example.

Considering the present invention from a somewhat different point of view, it may be regarded as a modified vane pump, i. e., as a modified pump of the type having a stator provided with an inlet and an outlet and having a driving rotor provided with generally radially movable vanes, the present invention modifying such a vane pump by mounting the stator for rotation about the axis of the driving rotor so as to provide a driven rotor, by providing the rotatable stator or driven rotor with a by-pass passage shortcircuiting the inlet and the outlet, and by providing a valve in the by-pass passage for controlling the rate of shortcircuiting from the outlet to the inlet so as to vary the ratio of the speeds of the driving rotor and the rotatable stator or driven rotor. An important object of the invention is to provide such a modified vane pump.

The foregoing objects and advantages of the present invention, together with various other objects and advantages thereof which will appear hereinafter, may be attained with the exemplary embodiments of the invention which are illustrated in the accompanying drawings and which are described in detail hereinafter. Referring to the drawings:

Fig. 1 is a longitudinal sectional view of a variable-ratio hydraulic transmission of the invention;

Figs. 2, 3 and 4 are transverse sectional views respectively taken along the broken lines 2—2, 3—3 and 4—4 of Fig. 1;

Figures 9, 10:
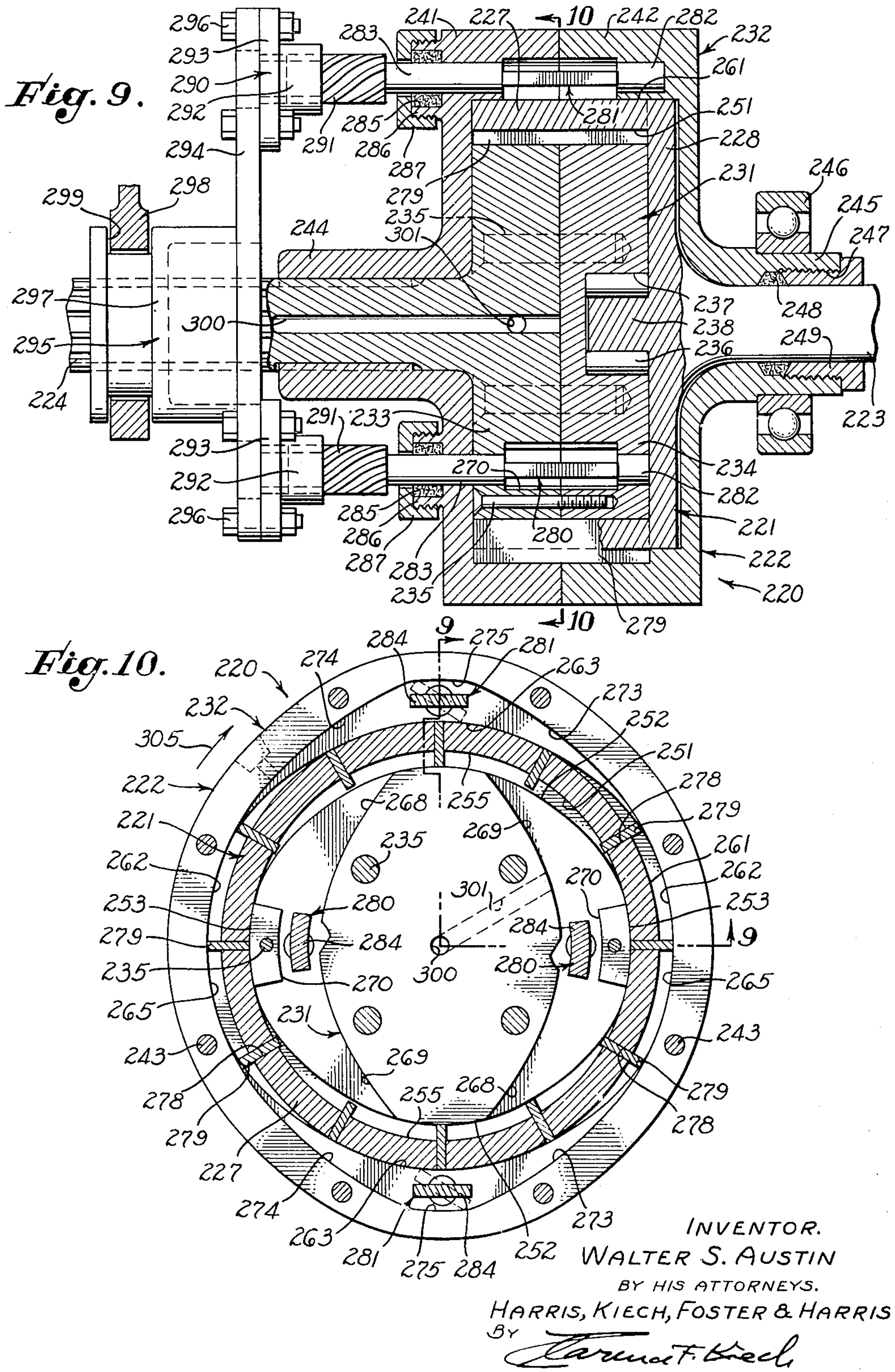
Figure 11:
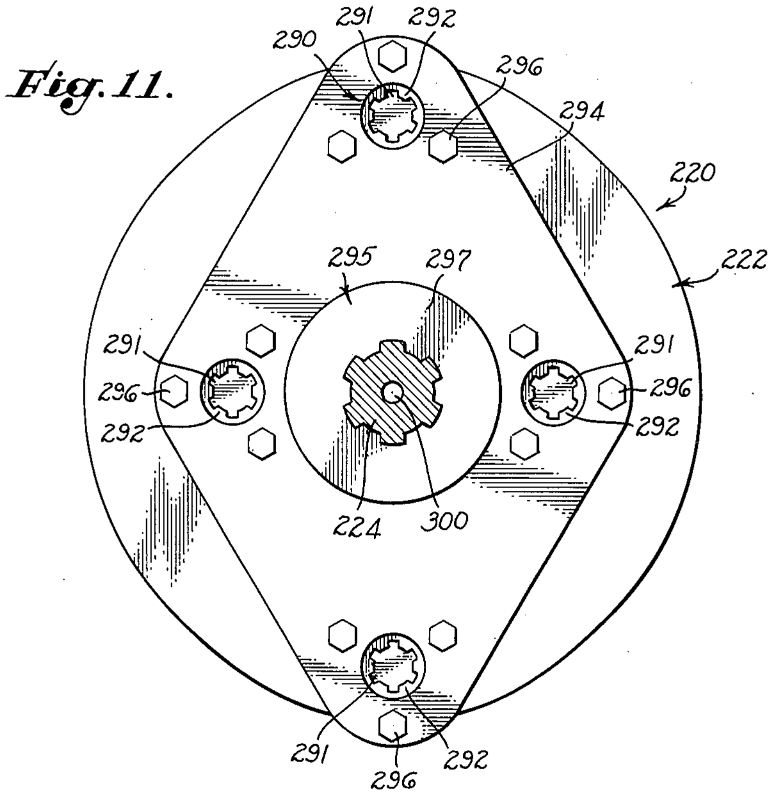
Figure 12:
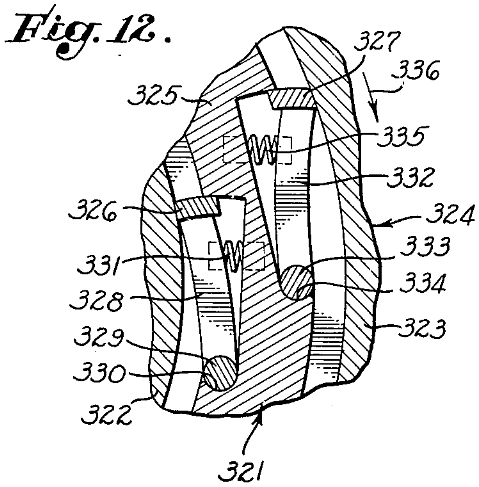
Figure 13:
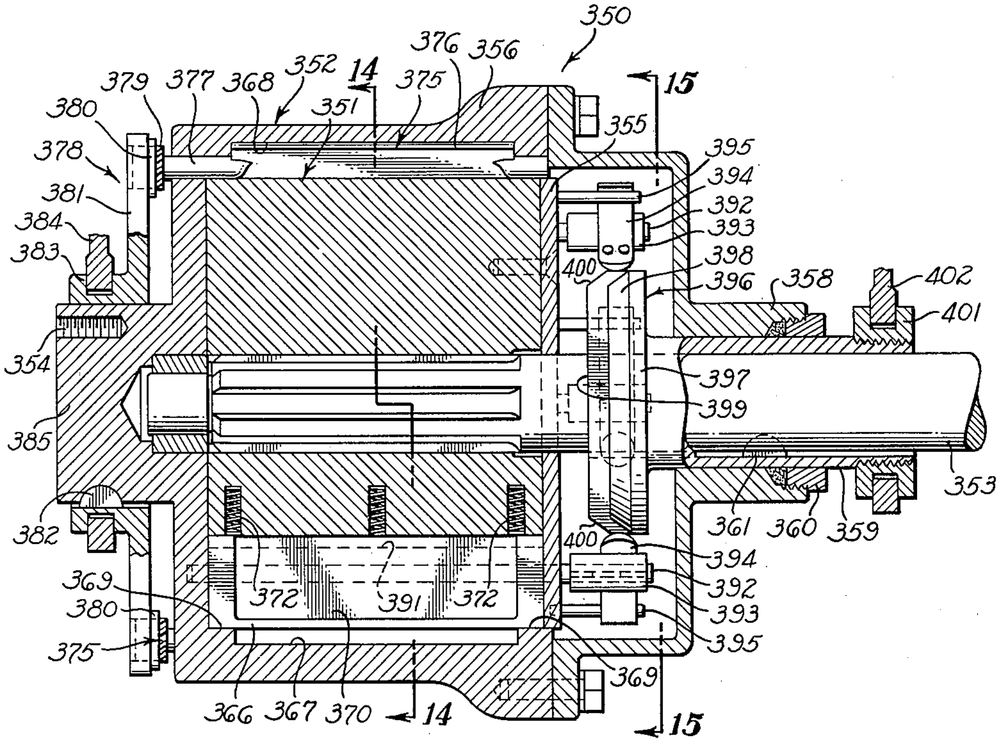
Figure 16:
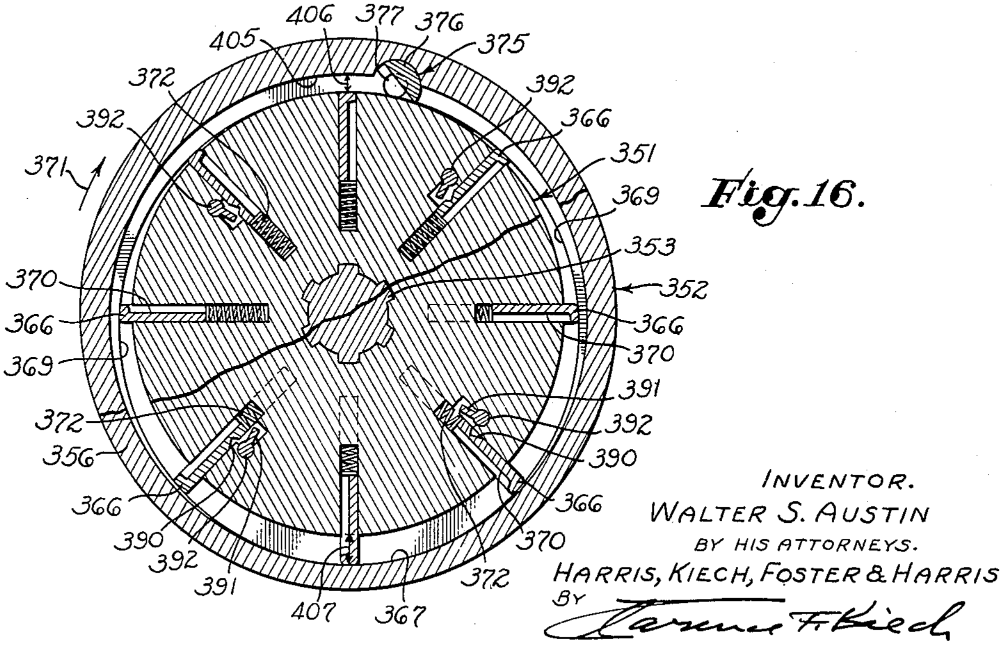
Figure 14:
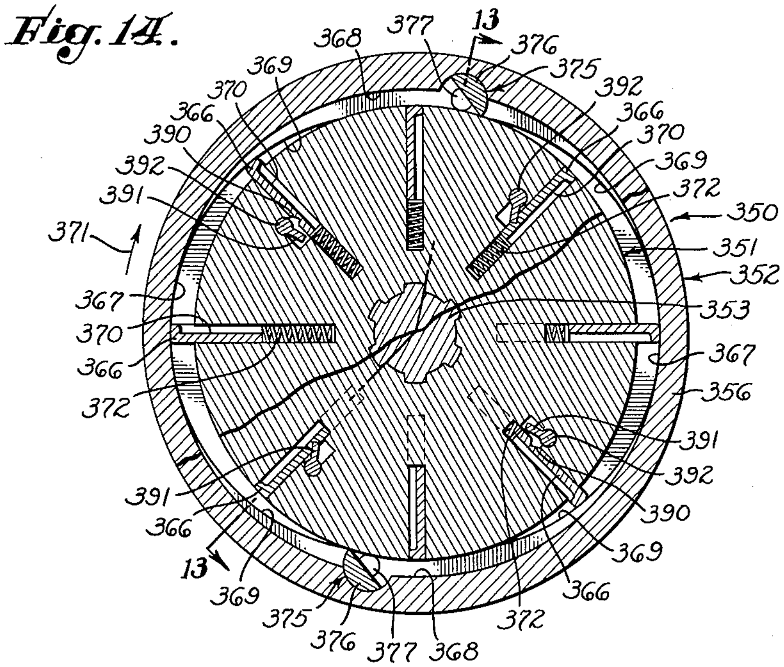
Figure 15:
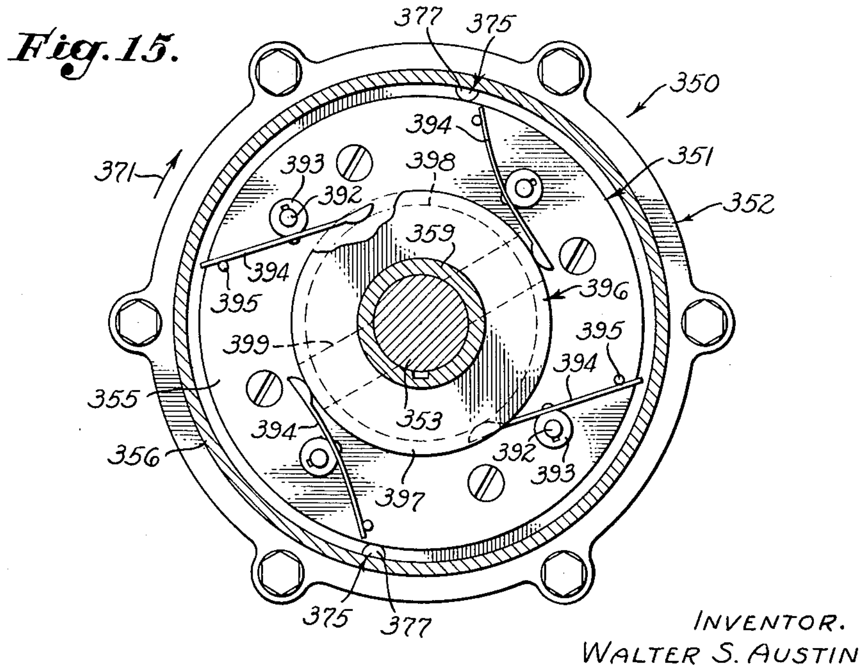

Figs. 9 and 10 are longitudinal and transverse, respectively, sectional views of another embodiment of the variable-ratio hydraulic transmission of the invention, Fig. 9 being taken along the broken line 9—9 of Fig. 10 and Fig. 10 being taken along the broken line 10—10 of Fig. 9;

Fig. 11 is an end view of the transmission illustrated in Figs. 9 and 10, being taken from the left end, as viewed in Fig. 9;

Fig. 12 is a fragmentary sectional view of an alternative vane embodiment for the transmission embodiment of Figs. 9 to 11;

Fig. 13 is a longitudinal sectional view of still another embodiment of the variable-ratio hydraulic transmission of the invention, Fig. 13 being taken along the irregular broken line 13—13 of Fig. 14;

Figs. 14 and 15 are transverse sectional views respectively taken along the broken lines 14—14 and 15—15 of Fig. 13 of the drawings; and Fig. 16 is a view similar to Fig. 14, but illustrating a further embodiment of the invention.

Figure 1:
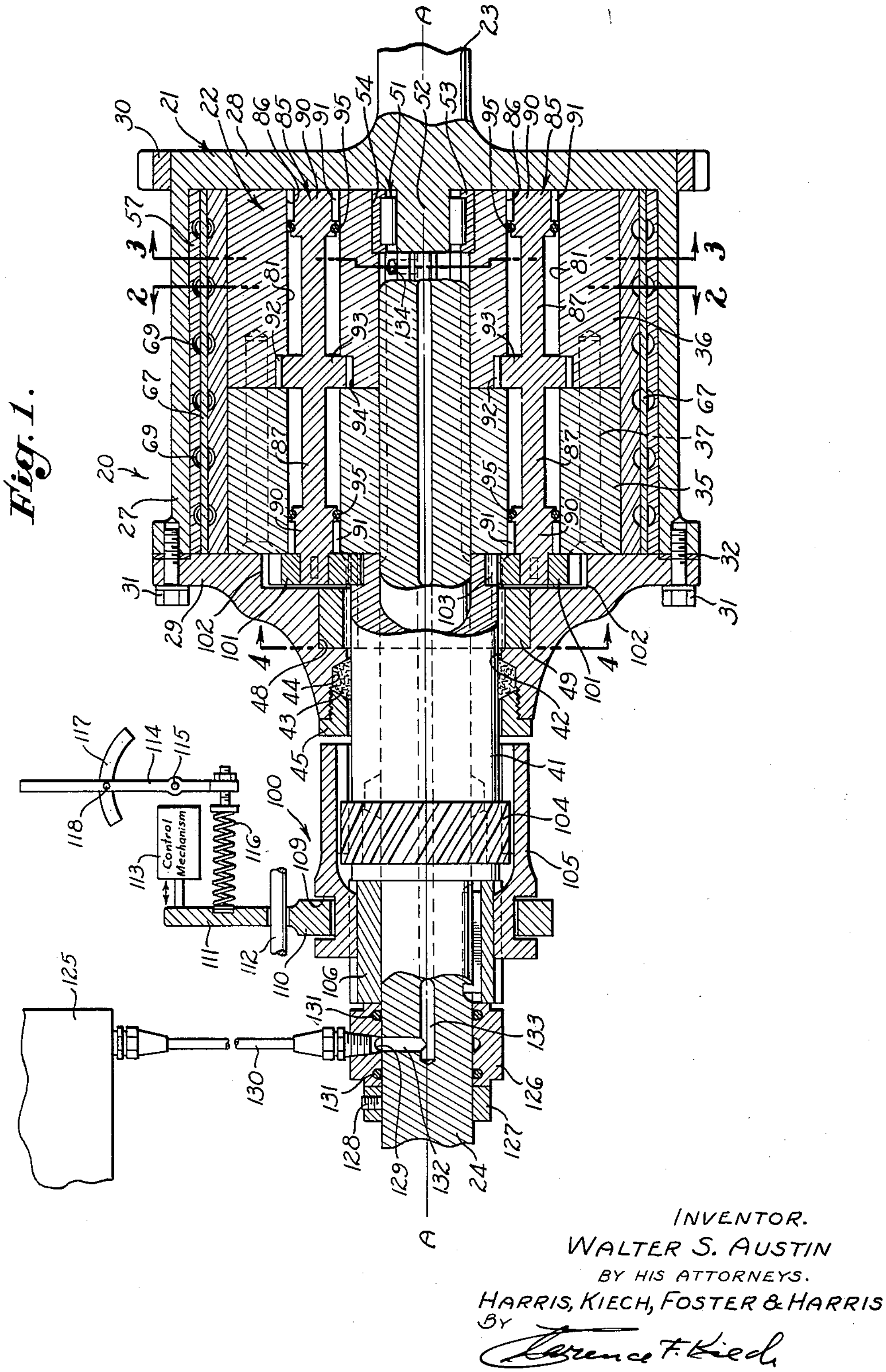
Figure 2:
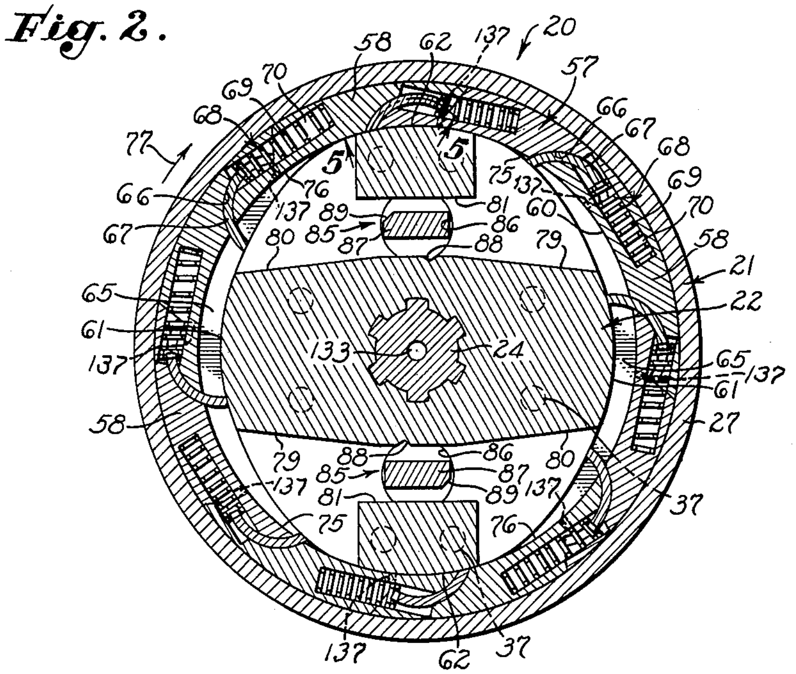
Figure 3:
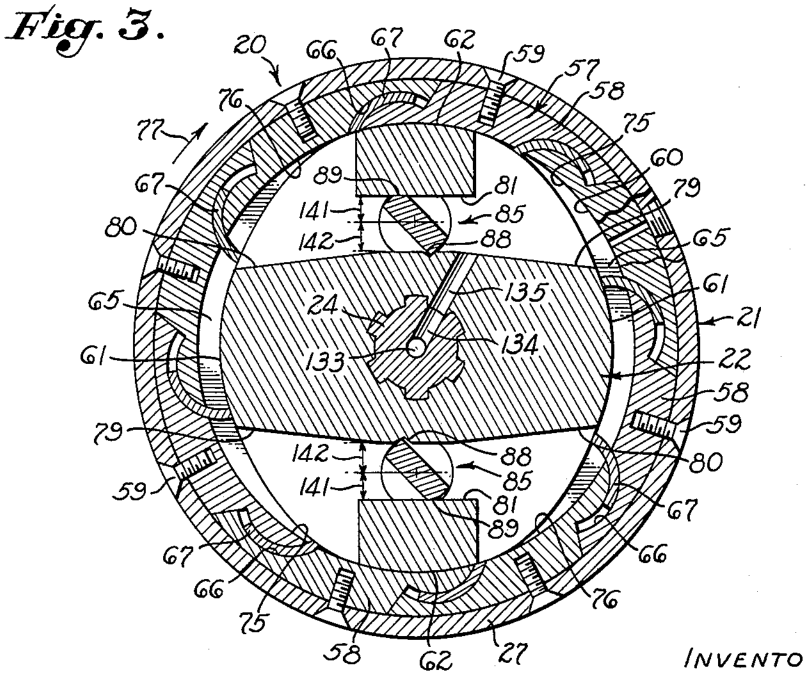

Referring particularly to Figs. 1, 2 and 3 of the drawings, the numeral 20 designates a variable-ratio hydraulic transmission of the invention which includes driving and driven rotors 21 and 22 mounted for rotation about a common axis A—A, the driving rotor having connected thereto a driving shaft 23 and the driven rotor having connected thereto a driven shaft 24. In the particular construction illustrated, the driven rotor 22 is nested in the driving rotor 21, the latter providing a housing for the driven rotor.

The driving rotor 21 includes a cylindrical annulus 27 which encircles the driven rotor 22 and which is closed at its ends by end walls 28 and 29. In the particular construction illustrated, the end wall 28 is formed integrally with the annulus 27 and is also formed integrally with the driving shaft 23, the latter being connected to any source of power desired. For example, the driving shaft 23 may be connected to the engine of an automobile, in which case the driving shaft 23 may be the crank shaft of such engine, if desired. In such event, the driving rotor 21 acts as the flywheel of the engine and may have pressed thereon an annular gear 30 with which the driving gear of a starter, not shown, may mesh in the usual manner. The end wall 29 takes the form of a removable cap in the particular construction ilustrated, being secured to the annulus 27 by cap screws 31, or the like. Preferably, a gasket 32 is disposed between the cap 29 and the annulus 27.

Figure 4:
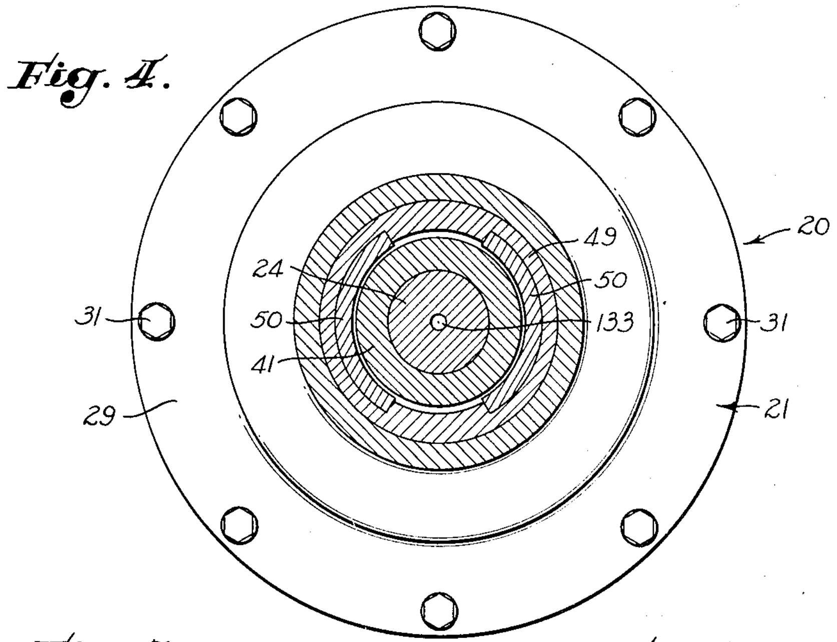

The driven rotor 22, which is illustrated as divided transversely into two elements 35 and 36 secured together by screws 37, is disposed within the driving rotor 21 and is provided with transverse end surfaces which respectively engage the end walls 28 and 29 of the driving rotor with a substantially fluid-tight fit. The driven rotor 22 is provided with a splined bore 38 therethrough which receives a complementarily splined section of the driven shaft 24 so as to connect the driven shaft to the driven rotor. The driven shaft 24 extends through a collar 41 which is rotatable relative thereto, the collar 41 extending from the driving rotor 21 through a bore 42 in the cap 29 of the driving rotor. A fluid-tight seal between the cap 29 and the collar 41 is provided by packing 43 disposed in an outer counterbore 44 in the cap 29 and retained therein by a packing gland 45 threaded thereinto. Disposed in an inner counterbore 48 in the cap 29 is an annular bearing 49 which is provided with bearing inserts 50, Fig. 4, for the collar 41. As will be discussed in more detail hereinafter, one collar 41, while rotatable relative to the driven shaft 24, is rotatable with respect thereto through relatively small angles and normally rotates therewith so that the bearing 49 with its inserts 50 serves as a bearing for relative rotation between the driving and driven rotors 21 and 22. An additional bearing 51 for relative rotation between the driving and driven rotors 21 and 22 encircles a stub shaft 52 on the end wall 28 of the driving rotor. The bearing 51 is preferably a roller bearing, or the like, and the stub shaft 52 serves as the inner race thereof, an outer race 53 being disposed in a counterbore 54 in the driven rotor.

As best shown in Figs. 2 and 3 of the drawings, the driving rotor 21 includes a liner 57 for the annulus 27, the liner including a plurality of circumferentially-spaced and abutting liner sections 58 secured to the annulus by screws 59, Fig. 3, or the like. The liner 57 provides the driving rotor 21 with an inner peripheral wall 60 which is concentric with respect to the axis of rotation A—A of the driving and driven rotors.

The driven rotor 22, in the particular construction illustrated, is provided with a peripheral wall which preferably includes at least two eccentric sections 61 of a larger radius of curvature than the radius of curvature of the peripheral wall 60, and a corresponding number of concentric sections 62 of substantially the same radius of curvature as the radius of curvature of the peripheral wall 60, the peripheral wall sections 61 and 62 being arranged in alternating relation circumferentially. Thus, this construction provides between each of the peripheral wall sections 61 of the driven rotor 22 and the peripheral wall 60 of the driving rotor 21 an arcuate, circumferentially extending space or chamber 65 the radial dimension of which varies from a maximum value intermediate its ends to minimum values at its ends. Since the radius of curvature of the peripheral wall sections 62 of the driven rotor 22 is substantially equal to that of the peripheral wall 60 of the driving rotor 21, the arcuate chambers 65 are closely adjacent and sealed with respect to each other in a substantially fluid-tight manner by engagement of the peripheral wall sections 62 with the peripheral wall 60. Thus, the minimum radial dimensions referred to above for the ends of the arcuate chambers 65 may desirably be substantially equal to zero, being equal only to the clearances between the peripheral wall 60 and the peripheral wall sections 62 which are necessary for relative sliding movement therebetween during relative rotation of the driving and driven rotors.

Referring particularly to Figs. 2 and 3 of the drawings, the liner 57 is provided with a plurality of circumferentially spaced slots 66 of arcuate cross section which extend longitudinally of the liner, i. e., parallel to the axis of rotation A—A of the driving and driven rotors 21 and 22, the slots 66 being located at the overlapping junctions of the liner sections 58 for convenience in machining. However, these slots may be otherwise formed. Disposed in each slot 66 is a complementary vane 67 which makes substantially fluid-tight seals at its ends with the end walls 28 and 29 of the driving rotor.

Figures 5, 6, 7, 8:
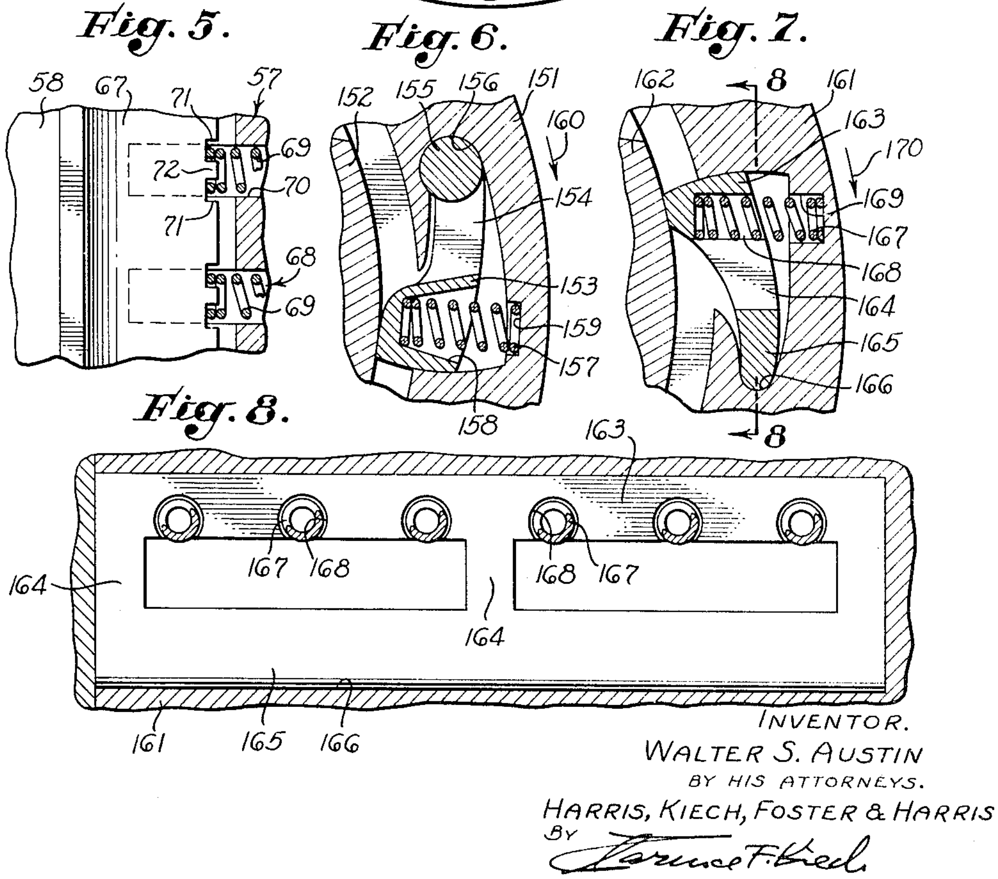
Fig. 5 is a fragmentary elevational view of a portion of a vane incorporated in the embodiments illustrated in Figs. 1 to 4 and is taken as indicated by the arrows 5—5 of Fig. 2.
Figs. 6 and 7 are fragmentary sectional views of alternative embodiments.
Fig. 8 is a sectional view taken along the broken line 8—8 of Fig. 7.

As will be apparent, the vanes 67 may move inwardly and outwardly in the slots 56 in generally radial directions to permit maintaining the liner edges of the vanes in sliding engagement with the peripheral wall sections 61 and 62 of the driven rotor 22 as the driving rotor rotates relative to the driven rotor, such generally radial movement of the vanes being necessary to compensate for the varying radial dimensions of the arcuate chambers 65, as will be apparent. Means 68 for biasing each vane inwardly toward the driven rotor 22 is provided for each vane, each biasing means thus maintaining the inner edge of its vane in engagement with one of the peripheral wall sections 61 and 62 of the driven rotor. Each biasing means 68 is illustrated as including a plurality of compression springs 69 disposed in bored sockets 70 in the liner 57 and engaging the outer edge of the corresponding vane. As best shown in Fig. 5, the outer edge of each vane is provided with a plurality of pairs of notches 71, each pair of notches defining a lug 72 which fits into one end of one of the springs 69. Thus, the sockets 70 retain the springs 69 in place relative to the liner 57 and the lugs 72 retain the springs in place relative to the vanes 67.

As a matter of convenience, each of the arcuate chambers 65 will be regarded as having circumferentially spaced inlet and outlet ends 75 and 76 located at the ends of the corresponding peripheral wall sections 61 of the driven rotor 22, the outlet end 76 of each arcuate chamber being spaced circumferentially from the inlet end 75 thereof in the direction of rotation of the driving and driven rotors, as indicated by the arrow 77. The inlet and outlet ends 75 and 76 of each arcuate chamber 65 respectively communicate with inlet and outlet ports 79 and 80 formed in the corresponding peripheral wall section 61 of the driven rotor 22. The inlet and outlet ports 79 and 80 for each arcuate chamber 65 are of substantial circumferential dimensions so that the unbroken area of the corresponding peripheral wall section 61 between such inlet and outlet ports is provided with a circumferential dimension substantially equal to the circumferential spacing of the vane 67. With this construction, as one vane moves out of registry with the inlet port 79 of one of the arcuate chambers 65 in response to rotation of the driving rotor 21 relative to the driven rotor 22, the preceding vane moves into registry with the outlet port 80 of such chamber. It will be understood, of course, that the circumferential dimensions of the inlet and outlet ports 79 and 80 depend on the circumferential spacing of the vanes.

Each of the outlet ports 80 is connected in fluid communication with the inlet port 79 for the adjacent arcuate chamber 65 by a by-pass passage 81 through the driven rotor 22. Thus, as the driving rotor 21 rotates in the direction of the arrow 77 relative to the driven rotor 22, the vanes discharge liquid from the outlet ends 76 of the arcuate chambers 65 into the outlet ports 80, the liquid discharged by the vanes in this manner being conducted through the by-pass passages 81 and the inlet ports 79 into the inlet ends 75 of adjacent arcuate chambers. Thus, the by-pass passages 81 short-circuit the pumping action of the driving rotor 21 by connecting the outlet ports 80 of the respective arcuate chambers to the inlet ports 79 of the adjacent arcuate chambers.

In order to control the rates of discharge of liquid from the arcuate chambers 65 through the by-pass passages 81, i. e., in order to control the rates of short-circuiting of the pumping action of the driving rotor 21 and the torque transmitted, the driven rotor 22 carries valves 85 capable of varying the resistance to flow through the respective by-pass passages 81. In the particular construction illustrated, the valves 85 are rotary valves of the butterfly type, although they may be of any other desired type without necessarily departing from the spirit of the invention. As best shown in Figs. 2 and 3 of the drawings, the valves 85 are respectively disposed in bores 86 through the driven rotor 22, the bores 86 being parallel to the axis of rotation A—A of the driving and driven rotors and intersecting the respective by-pass passages 81. As best shown in Figs. 1, 2 and 3, each valve 85 is provided with a pair of rectangular sections 87 which are adapted to seat against opposite sides of the corresponding by-pass passage 81 to close such by-pass passage. As best shown in Figs. 2 and 3, one of the trailing or downstream corners of each rectangular section is adapted to seat in a notch 88 in one wall of the corresponding by-pass passage 81, thus providing an enlarged area of contact between the rectangular sections 87 and such wall of the corresponding by-pass passage. Alternatively, the same effect may be attained by beveling the corners of the rectangular sections which engage the walls of the corresponding by-pass passage, one of the upstream corners being illustrated as beveled at 89 for engagement with the corresponding by-pass-passage wall.

Each valve 85 is provided adjacent its ends with shaft sections 90 which are rotatably mounted in the corresponding bore 86 in the driven member 22 by means of roller bearings 91, which may be needle bearings, for example. If desired, an intermediate bearing 92 associated with an intermediate shaft section 93 may be employed also, the intermediate shaft section 93 being illustrated as of larger diameter than the end shaft-sections 90 with the intermediate bearing 92 disposed in a counterbore 94 in the driven rotor 22. Such counterbore is located in one end face of the driven rotor element 36. Preferably, the intermediate shaft section 93 extends into the counterbore 94 so as to prevent axial shifting of the corresponding valve 85. In order to prevent leakage past the valve 85 by way of the end bearings 91 when the valves are in their closed position, annular sealing elements, such as O-rings 95, may be employed.

The transmission 20 includes a control means 100 for simultaneously varying the positions of the valves 85 so that such valves may be operated in unison. The control means 100 includes individual gears 101 fixed on the valves 85 and disposed in recesses 102 in the cap 29 of the driving rotor 21. Meshed with the individual gears 101 is a control gear 103 formed or fixed on the collar 41. Also formed or fixed on the collar 41 is a helical gear 104 which is meshed with a ring gear 105 having the form of a collar provided with internal helical splines complementary to and meshed with the helical teeth on the gear 104. The ring gear 105 is splined to a bushing 106 which, in turn, is keyed to the driven shaft 24. As will be apparent, with this construction, axial displacement of the ring gear 105 results in rotation of the collar 41 relative to the driven shaft 24, such rotation of the collar 41 resulting in rotation of the valves 85 because of the gear connections therebetween. Thus, the valves 85 may be rotated between their open and closed positions in unison by axially shifting the ring gear 105.

In order to shift the ring gear 105 axially to control the positions of the valve 85, the ring gear is provided with an annular groove 109 which receives a yoke or annulus 110 having an arm 111, the annulus being guided by a guide bar 112 extending through the arm 111 and shown only diagrammatically. As will be apparent, axial movement of the annulus 110 will result in axial movement of the ring gear 105 to rotate the valves 85. The annulus 110 may be controlled either automatically, or manually. For example, it may be controlled automatically by a control mechanism 113 connected to the arm 111, the control mechanism being responsive to any desired variable, such as the speed of an automobile motor connected to the driving rotor 21, the speed of the driven member, the relative speeds of the driving and driven member, etc. Alternatively, the annulus 110 may be controlled manually, as by a lever 114 pivotally mounted at 115 and connected to the arm 111 through a spring 116. The lever 114 is illustrated as pivotable relative to a quadrant 117. Preferably, the lever carries detent means 118 engageable with the quadant to hold the lever in various operating positions.

Preferably, a reservoir 125 is provided to accommodate thermal expansion of the oil or other liquid in the transmission 20 and to maintain the transmission filled with oil. Considering the manner in which the reservoir 125 is connected in fluid communication with the transmission 20, a swivel fitting 126 is carried by the driven shaft 24 and is rotatable relative thereto, the swivel fitting being seated against the bushing 106 and being retained by a collar 127 secured to the driven shaft by a set screw 128. The swivel fitting 126 is provided with an internal annular groove 129 which communicates with the reservoir 125 through a tube 130, annular sealing elements, such as O-rings 131, being disposed in internal annular grooves on opposite sides of the groove 129 to prevent leakage from the groove 128 along the driven shaft. The driven shaft 24 is provided with a radial passage 132 which registers with the annular groove 129 in the swivel fitting and which communicates with a longitudinal passage 133 in the driven shaft. The longitudinal passage 133 communicates within the transmission 20 with a radial passage 134 in the driven shaft, this radial passage communicating with a passage 135 in the driven rotor 22. The radial passage 125 communicates with the interior of the transmission by way of one of the by-pass passages 81. Thus, the interior of the transmission 20 is in constant communication with the reservoir 125.

Considering the operation of the transmission 20 with particular reference to Figs. 2 and 3 of the drawings, it will be assumed that the valves 85 are open and that the driving rotor 21 is being rotated in the direction of the arrow 77 by the engine, or other source of power, connected thereto. Under such conditions, the vanes 67 merely discharge the liquid from the outlet ends 76 of the arcuate chambers 65 into the inlet ends 75 of adjacent arcuate chambers by way of the by-pass passages 81. Preferably, the areas of the by-pass passages 81 are such that no appreciable pressure is developed in the liquid under such conditions, at least for a relatively low rotational speed of the driving rotor 21, corresponding, for example, to the idling speed of an engine connected to the driving rotor. However, in order to avoid increasing the size of the valves 85 unduly, the areas of the by-pass passages 81 may be such that the vanes 67 develop pressure in the liquid at relatively high rotational speeds of the driving rotor 21 even with the valves open, if desired.

As long as the valves 85 are open and the rotational speed of the driving rotor 21 is such that no appreciable pressure is developed in the liquid by the vanes 67, the pumping action of the driving rotor is merely short-circuited through the by-pass passages 81 so that the driven rotor 22 remains stationary. Thus, the transmission 20 is, in effect, in neutral under such conditions.

Now let us assume that the control means 100 is actuated, either automatically by the control mechanism 113, or manually by the lever 114, to rotate the valves 85 toward their closed positions. Under such conditions, the valves 85 increase the restriction to flow through the by-pass passages 81 so as to reduce the rate at which the liquid is discharged through the by-pass passages by the vanes 67. Consequently, the vanes 67 develop a pressure in the liquid in the transmission 20 which is applied to the valves 85 to rotate the driven rotor 22. In effect, arcuate columns or pistons of liquid under pressure are formed between the valves 85 and those vanes 67 which are in contact with the unbroken areas of the peripheral wall sections 61 between the inlet and outlet ports 79 and 80, one end of each such liquid column or piston being seated against and confined by a vane in contact with one of the unbroken areas of the peripheral wall sections 61, and the other end of each such liquid column or piston being seated against and at least partially confined by one of the valves 85, depending upon the extent of opening of such valves. Thus, the driven rotor 22 is, in efffect, driven by columns or pistons of liquid under pressure formed between the valves 85 and those vanes 67 which are active.

As hereinbefore discussed, the circumferential dimension of the unbroken areas of the peripheral wall sections 61 between the inlet and outlet ports 79 and 80 is substantially equal to the circumferential spacing of the vanes 67 so that as soon as each liquid column or piston is dissipated by movement of the corresponding vane 67 into registry with one of the outlet ports 80, another liquid column is formed by the succeeding vane 67, such succeeding vane moving out of registry with the inlet port 79 of each arcuate chamber 65 at substantially the same time that the preceding vane moves into registry with the outlet port 80 of such arcuate chamber. Thus, a steady flow of power from the driving rotor 21 to the driven rotor 22 is assured, there being substantially no pulsation in the power transmitted to the driven rotor.

In the foregoing discussion, it was assumed that the valves 85 had been rotated from their open positions toward their closed positions into partially open positions. As will be apparent, if the valves 85 are rotated into their closed positions, either automatically by the control mechanism 113, or manually by the lever 114, short-circuiting of the liquid through the by-pass passages 81 is prevented. As discussed above, the driving rotor 21 drives the driven rotor 22 through liquid columns or pistons formed between the valves 85 and those vanes 67 which are active, i. e., which are in engagement with the unbroken areas of the peripheral wall sections 61 between the inlet and outlet ports 79 and 80, the only difference being that such liquid columns persist and are not dissipated periodically, except by leakage, to be replaced by new liquid columns.

Thus, it will be apparent that the rotational speed of the driven rotor 22 may be varied from zero to that of the driving rotor 21 by moving the valves 85 from their open positions to their closed positions, an infinite number of rotational speeds being available in this range for the driven rotor 22. Thus, by varying the positions of the valves 85, the transmission 20 is capable of providing an infinite number of speed ratios between the driving and driven rotors.

An important feature of the invention resides in locating the by-passes and the valves on the driven rotor in this and the hereinafter-described embodiments. As will be apparent, any friction between the fluid and the valves 85 and between the fluid and the walls of the by-pass passages 81 is converted into torque applied to the driven rotor, whereby losses from this source are completely eliminated, which is a very important advantage.

Preferably, the valves 85 are unbalanced so that the action of the liquid columns or pistons developed by the vanes 67 tends to rotate the valves into their open positions. This may be accomplished by making the area of the downstream portions of the rectangular sections 87 of the valves larger than the area of the upstream portions of such rectangular sections, it being understood that the valves of the embodiments hereinafter described may be unbalanced in a similar manner. In the particular embodiment under consideration, this is accomplished by beveling the rectangular sections 87 of the valves sufficiently at 89 to make the effective upstream area of the valves less than the effective downstream area thereof, the effective upstream and downstream areas being respectively proportional to the dimensional arrows 141 and 142 in Fig. 3 of the drawings.

Considering the effect of unbalancing the areas of the valves 85 in the foregoing manner so that the valves are biased toward their open positions by the pressure applied thereto by the vanes 67, it will be assumed that the lever 114 is locked with respect to the quadrant 117 by the detent means 118 in such a position that the valves 85 are either closed or partly open. Under such conditions, the spring 116 interposed between the lever 114 and the arm 11 of the annulus 110 maintains the valves 85 in the selected positions as long as the conditions remain constant. However, let us assume that the foregoing conditions are altered by increasing the load on the driven shaft 24. For example, assuming that the transmission 20 is installed in an automobile, such an increase in the load on the driven shaft 24 may result from ascending a grade with the automobile after having previously been traveling over a level road. Such an increase in the load on the driven shaft tends to reduce the speed thereof with the result that the pressure applied to the valves 85 by the vanes 67 increases. Consequently, the valves, being unbalanced, rotate slighly toward their open positions in opposition to the action of the spring 116. Such opening of the valves results in an increase in the ratio of the speed of the driving rotor 21 to that of the driven rotor 22 by permitting a reduction in speed of the driven rotor, thereby permitting the rotational speed of the driving rotor 21 to remain substantially constant. Thus, with this construction, the transmission automatically "shifts into a lower gear" as the load increases. The net result is that substantially the same amount of power is transmitted to the driven shaft 24, but is transmitted thereto in the form of an increased torque at a reduced rotational speed, which is an important feature.

While the valves 85 have been disclosed as rotary valves of the butterfly type, it will be understood that various types of valves may be employed, such as reciprocating valves, needle valves, and the like. Also, the particular valves disclosed may be streamlined if desired to reduce the resistance to flow offered thereby when in their open or partially open positions.

Also, while the vanes 67 have been illustrated as biased into engagement with the periphery of the driven rotor 22 by springs, it will be understood that they may be biased into engagement therewith in other ways. For example, the vanes 67 may be biased hydraulically and it should be noted that the vanes 67 are biased hydraulically to some extent in the particular construction illustrated since the pressure developed by the vanes is applied to the outer edges thereof, i. e., the edges thereof adjacent the springs 69, as through slots 137 ahead of the vanes.

Various vane structures may be employed as alternatives for the vanes 67, two alternative vane structures being illustrated in Figs. 6 to 8 of the drawings. Referring first to Fig. 6, illustrated therein, in fragmentary form, are driving and driven rotors 151 and 152, the driving rotor having a recess therein for a vane 153. This vane is provided with arms 154 which carry a pin 155 extending parallel to the vane, the pin being journalled in a cylindrical portion 156 of the recess in the driving rotor. Thus, the vane 153 moves generally radially relative to the driving rotor 151 by a pivoting action, the vane being biased into engagement with the driven rotor 152 by one or more springs 157 each seated in a socket 158 in the vane and a socket 159 in the driving rotor. In this embodiment, the direction of rotation is indicated by the arrow 160 so that the vane leads, i. e., is located in advance of, its point of pivotal connection to the driving rotor.

In Figs. 7 and 8 of the drawings, the numerals 161 and 162 respectively designate driving and driven rotors, the driving rotor again having a recess therein for a vane 163 having arms 164 joined by an arcuate element 165. The latter is journaled in a complementary portion 166 of the recess in the driving rotor 161 so that the vane 163 is movable generally radially relative to the driving rotor by a pivoting action. Springs 167 disposed in sockets 168 in the vane 163 and in sockets 169 in the driving rotor 161 bias the vanes into engagement with the driven rotor 162. The direction of rotation of the driving rotor 161 is in the direction indicated by the arrow 170 so that the vane 163 trails its point of pivotal connection to the driving rotor. As will be apparent, with this construction, the pressure developed by the vane acts on the outer surface thereof to assist in biasing the vane into engagement with the driven rotor.

Hereinbefore, it was pointed out that at least two arcuate pumping chambers are preferably provided and connected in series, the reason for this being to reduce the load imposed on the various elements and to provide smoother operation. If desired, several of the arcuate pumping chambers may be provided between the driving and driven rotors and connected in series to further reduce the loads on such elements as the vanes, valves, and the like. Alternatively, instead of employing a plurality of arcuate pumping chambers connected in series, two or more independent series of such pumping chambers may be provided, a transmission 220 embodying such an arrangement of pumping chambers being illustrated in Figs. 9 to 11 of the drawings.

Referring thereto, the transmission 220 includes driving and driven rotors 221 and 222 respectively connected to driving and driven shafts 223 and 224. The driving rotor 221 includes an annulus or annular rotor element 227 formed integrally with a circular end wall 228, the driving shaft 223 being integral with the end wall 228 in the particular construction illustrated.

The driven rotor 222 includes an inner rotor element 231 nested in the driving rotor 221 and includes an outer rotor element 232 in which the driving rotor is nested. The inner rotor element 231 is divided transversely into two parts 233 and 234 secured together by screws 235, or the like, the driven shaft 224 being formed integrally with the part 233 of the inner rotor element in the particular construction illustrated. In order to permit relative rotation of the driving rotor 221 and the driven rotor 222, a roller bearing 236 is disposed in a bore 237 in the part 234 of the inner rotor element 231 and encircles a stub shaft 238 on the end wall 228 of the driving rotor 221.

The outer rotor element 232 of the driven rotor 222 is also divided transversely into two parts, such parts being designated by the numerals 241 and 242 and being secured together by bolts 243 or the like. As will be apparent, the parts 241 and 242 of the outer rotor element 232 are generally cup-shaped and enclose the inner rotor element 231 and the driving rotor 221. The part 241 of the outer rotor element 232 is provided with an internally splined hub 244 which engages an externally splined portion of the driven shaft 224. Thus, the inner and outer rotor elements 231 and 232 of the driven rotor 222 are locked together. The part 242 of the outer rotor element 232 is provided with a hub 245 through which the driving shaft 233 extends, the hub 245 carrying a ball bearing 246 for mounting the transmission 220 on any suitable supporting structure, not shown. The hub 245 is provided with a counterbore 247 which contains packing 248 held in place by a packing gland 249 threaded into such counterbore, thus preventing leakage from the interior of the transmission 220 along the driving shaft 233. As will be apparent, leakage along the driven shaft 224 is prevented by the splined connection between the hub 244 and the driven shaft.

As best shown in Fig. 10 of the drawings, the annulus 227 of the driving rotor 221 provides a concentric inner peripheral wall 251. The inner rotor element 231 of the driven rotor 222 has a periphery which is divided into eccentric peripheral wall sections 252 of larger diameter than the diameter of the peripheral wall 251, and concentric peripheral wall sections 253 of substantially the same diameter as the diameter of the peripheral wall 251, the peripheral wall sections 252 and 253 being arranged alternately in the same manner as the peripheral wall sections of the transmission 220. Thus, arcuate pumping chambers 255 are formed between the inner peripheral wall 251 of the annulus 227 and the respective peripheral sections 252 of the inner rotor element 231.

Similarly, the annulus 227 provides an outer peripheral wall 261 which is concentric with the axis of rotation of the driving and driven rotors, and the inner periphery of the outer rotor element 232 is provided with eccentric peripheral wall sections 262 of larger diameter than the outer peripheral wall 261, and with concentric peripheral wall sections 263 of substantially the same diameter as the outer peripheral wall 261. Thus, arcuate pumping chambers 265 are provided between the outer peripheral wall 261 of the annulus 227 and the respective peripheral wall sections 262 of the outer rotor element 232.

Each of the inner arcuate pumping chambers 255 is provided with inlet and outlet ports 268 and 269 respectively communicating with the inlet and outlet ends thereof, such inlet and outlet ports being formed in the inner rotor element 231. Also formed in the rotor element 231 are by-pass passages 270 each of which connects the outlet port 269 of one of the pumping chambers 255 to the inlet port 268 of the adjacent pumping chamber in substantially the same manner as in the transmission 20.

The outer arcuate pumping chambers 265 are provided with inlet and outlet ports 273 and 274 respectively communicating with the inlet and outlet ends thereof, such inlet and outlet ports being formed in the outer rotor element 232. Also formed in the outer rotor element are by-pass passages 275 each connecting the outlet port 274 of one of the pumping chambers 265 to the inlet port 273 of the adjacent pumping chamber 265.

Thus, it will be apparent that two series of pumping chambers are provided with this construction, the pumping chambers 255 being connected in series by the by-pass passages 270 and the pumping chambers 265 being connected in series by the by-pass passages 275. However, the two series of pumping chambers are independent, being separated by the annulus 227 of the driving rotor 221.

The annulus 227 of the driving rotor 221 is provided with circumferentially spaced, radial slots 278 therein for radially movable vanes 279 which are seated at one end against the end wall 228 of the driving rotor 221 and at the other end against the part 241 of the outer rotor element 232, the vanes extending parallel to the axis of rotation of the driving and driven rotors.

The vanes 279 are moved radially relative to the annulus 227 by a cam means which includes an inner cam surface comprising the peripheral wall sections 252 and 253 and an outer cam surface comprising the peripheral wall sections 262 and 263. In effect, the two cam surfaces defined by such peripheral wall sections provide a generally elliptical guide for the vanes which moves the vanes radially inwardly and outwardly relative to the annulus 227 upon relative rotation of the driving and driven rotors 221 and 222.

The rates of discharge of liquid from the pumping chambers 255 and 265 are controlled by valves 280 and 281 respectively disposed in the by-pass passages 270 and 275, the valves 280 and 281 being rotary valves of the butterfly type. Each of the valves 280 for the inner by-pass passages 270 includes a shaft section 282 journaled in a bore in the inner rotor element 231 and a shaft section 283 journaled in aligned bores in the inner rotor element and the outer rotor element and projecting from the outer rotor element. Similarly, each of the outer valves 281 is provided with a shaft section 282 journaled in a bore in the outer rotor element 232 and a shaft section 283 journaled in another bore in the outer rotor element and projecting from the outer rotor element.

Each of the valves 280 and 281 is provided with an intermediate rectangular section 284 which controls the rate of discharge through the corresponding by-pass passage 270 or 275. Preferably, as hereinbefore discussed, the rectangular sections 284 of the valves 280 and 281 are provided with areas on the downstream sides of their axes of rotation which are larger than the areas on the upstream sides thereof, as best shown in Fig. 10, so that the pressure applied thereto by the vanes 279 biases the valves toward their open positions with the advantages hereinbefore discussed.

Each projecting shaft section 283 of the valves 280 and 281 is encompassed by packing 285 disposed in a counterbored boss 286 on the outer rotor element 232, the packing being retained in each counterbored boss by a packing gland 287 threaded onto such boss.

The transmission 220 includes a control means 290 for operating all of the valves 280 and 281 in unison, the control means 290 including individual helical gears on the projecting shaft sections 283 of the valves. A control gear means is meshed with the helical gears 291, such control gear means comprising helical ring gears 292 encircling and meshed with the helical gears 291. The helical ring gears 292 are provided with flanges 293 for attachment to a flange 294 of a control member 295, as by bolts 296, Figs. 9 and 11. The control member 295 includes a cup-shaped hub 297 which is splined to the driven shaft 224 so as to be movable axially thereof and rotatable therewith. The control member 295 is adapted to be moved axially by an annulus 298 disposed in an annular groove 299 in the hub 297. The annulus 298 may be shifted axially in the same manner as the annulus 110 of the control means 100 for the transmission 20.

The driven shaft 224 is provided with a longitudinal passage 300 therethrough which communicates with a radial passage 301 through the inner rotor element 231. The longitudinal passage 300 may be connected in fluid communication with a reservoir, not shown, as in the transmission 20.

The operation of the transmission 220 is similar to that of the transmission 20 and will be discussed only briefly. Assuming rotation of the driving rotor 221 in the direction of the arrow 305, the vanes 279 merely discharge the liquid from the inner and outer pumping chambers 255 and 265 into adjacent pumping chambers by way of the by-pass passages 270 and 275, respectively, as long as the valves 280 and 281 are open and at least as long as the driving rotor is rotated at a relatively low speed. As discussed in connection with the transmission 20, the areas of the by-pass passages 270 and 275 may be such that sufficient pressure is developed to drive the driven rotor 222 upon rotation of the driving rotor 221 at relatively high speeds. Upon partial closing of the valves 280 and 281, the driven rotor 222 is driven at a rotational speed less than that of the driving rotor 221 and, upon complete closing of the valves, the driven rotor 222 is driven at substantially the same rotational speed as the driving rotor. Thus, it will be seen that the operation of the transmission 220 is substantially identical to that of the transmission 20, the only major difference being that the liquid circulates through two independent series of pumping chambers when the valves are open.

One advantage of the transmission 220 is that it distributes the loads imposed thereon among a larger number of elements than does the transmission 20 so as to reduce the loads imposed on the individual elements. Also, it will be noted that the outer pumping chambers 265 are staggered circumferentially with respect to the inner pumping chambers 255 so that a substantially continuous driving force is applied to the driven rotor, whereby to secure smoother operation, which is an important feature of this embodiment.

In Fig. 12 of the drawings is illustrated, in fragmentary from, a transmission which is similar to the transmission 220 in that it includes a driving rotor 321 disposed between inner and outer elements 322 and 323 of a driven rotor 324, the driving rotor comprising an annulus 325. This annulus is provided with inner and outer peripheries having recesses therein for inner and outer vanes 326 and 327, respectively. Each vane 326 includes arms 328 which carry a cylindrical pin 329 journaled in a cylindrical portion 330 of the recess for such vane, each vane 326 being biased into engagement with the inner rotor element 322 by one or more springs 331. Similiarly, each of the vanes 327 includes arms 332 which carry a cylindrical pin 333 journaled in a cylindrical portion 334 of the recess for such vane, each vane 327 being biased into engagement with the outer rotor element 323 by one or more springs 335. As will be apparent, the vanes 326 and 327 are movable generally radially with respect to the driving rotor 321 by virtue of their pivotal connections thereto. The direction of rotation of the driving rotor 321 is indicated by the arrow 336 so that the vanes 326 and 327 trail behind their points of pivotal connection to the driving rotor. Thus, the pressure developed by such vanes assists the springs 331 and 335 in biasing the vanes into engagement with their respective rotor elements 322 and 323.

Referring now to Figs. 13 to 15 of the drawings, illustrated therein is a variable-ratio hydraulic transmission 350 of the invention having a driving rotor 351 nested in a driven rotor 352, the driving rotor 351 being driven by a driving shaft 353 to which the driving rotor is splined, or otherwise secured. The driven rotor 352 is adapted to have a driven shaft, not shown, secured thereto, as by bolts, not shown, extending through a flange on the driven shaft and threaded into holes 354 in the driven rotor 352.

The driving rotor includes a circular plate 355 which is secured to the body of the driving rotor at one end thereof by screws, or the like. In the particular construction illustrated, the driven rotor 352 has the form of a housing 356 which is open at one end, such open end being closed by a cap 357 bolted or otherwise secured to the housing 356. The driving shaft 353 extends through the cap 357, the latter having a hub 358 which receives a sleeve 359 on the driving shaft. A seal between the sleeve 359 and the hub 358 is provided by packing held in place by a gland 360 threaded into the hub 358. The sleeve 359 is secured to the driving shaft 353 by a key 361, or the like, to permit axial movement of the sleeve relative to the driving shaft, but to prevent relative rotation thereof, all of a purpose to be described hereinafter.

Referring particularly to Fig. 14 of the drawings, the driving rotor 351 is provided with a plurality of radial slots for radially movable vanes 366, the driving and driven rotors 351 and 352 being spaced apart radially to provide therebetween two arcuate pumping chambers 367 into which the vanes 366 are adapted to extend. The radial spacing of the driving and driven rotors 351 and 352 also provides therebetween by-pass passages 368 which interconnect the two pumping chambers 367, each by-pass passage having an inlet port registering with the outlet end of one of the pumping chambers and having an outlet port registering with the inlet end of the other pumping chamber. In the particular embodiment under consideration, the by-pass passages are merely continuations of the pumping chambers, and vice versa.

As shown in Fig. 13 of the drawings, and as best shown in Fig. 14 thereof, outward movement of the vanes 366 is limited by vane guides 369, the latter having the form of inwardly extending shoulders on the housing 356 of the driven rotor 352 at opposite ends of the vanes in the particular construction illustrated. As will be apparent, as each vane approaches the inlet end of each pumping chamber 367, the vane guides 369 permit such vane to move radially outwardly, and as each vane approaches the outlet end of each pumping chamber, the vane guides move such vane radially inwardly. Intermediate the inlet and outlet ends of each pumping chamber 367, the vane guides 369 are tangent to the inner peripheral wall of the housing 356 of the driven rotor 352 so that the vanes engage the inner peripheral wall of the driven rotor intermediate the ends of the pumping chambers to provide a pumping action. The vanes 366 are hydraulically biased outwardly to maintain the outer edges thereof in engagement with the vane guides 369. In order to accomplish this, the vanes 366 are cut away, as indicated at 370, on the pressure side thereof, the direction of rotation being as indicated by the arrow 371. Springs 372 may also be employed to bias the vanes outwardly.

By-passing of the liquid from one of the pumping chambers 367 to the other through the by-pass passages 368 is regulated by control valves 375 in the by-pass passages. Each control valve 375 includes a hemicylindrical portion 376 which is rotatable between open and closed positions to control the flow through the corresponding by-pass passage 368, and is carried by a shaft 377 rotatably mounted on the driven rotor 352.

The transmission 350 includes a control means 378 for operating the valves 375 in unison, the control means including individual helical gears 379 fixed on ends of shafts 377 which extend through the end wall of the cup-like housing 356. The gears 379 are meshed with ring gears 380, respectively, which are carried by a control member 381, the latter being axially slidable on a hub 385 of the housing 356 and being prevented from rotating relative thereto by a key 382, or the like. The control member 381 includes a collar 383 having an annular groove therein to receive a yoke 384 for moving the control member 381 axially to rotate the control valves 375 into different operative positions, all as hereinbefore described in detail.

As in the embodiments previously described, the control valves 375 provide for variations in the ratio of the speeds of the driving and driven rotors 351 and 352. Additional control of such ratio is provided by locking or latching selected ones of the vanes 366 in retracted or inoperative positions. As best shown in Fig. 14 of the drawings, some of the vanes 366 are provided with notches 390 therein to receive latches 391 to lock such vanes in their retracted positions. The latches 391 are carried by shafts 392 which are rotatable relative to the driving rotor 351 to move the latches 391 into engagement with the notches 390. As best shown in Fig. 15 of the drawings, the shafts 392 project through the plate 355 at one end of the driving rotor 351 and have collars 393 fixed thereon, spring arms 394 being connected to the respective collars 393 intermediate the ends of such spring arms. One end of each spring arm 394 engages a stop pin 395 carried by the plate 355 and the other end of each spring arm is adapted to be engaged by an actuating means 396 for selectively operating the latches 391 to lock selected ones of the vanes in their retracted positions. As best shown in Fig. 13 of the drawings, the actuating means 396 inclues a head 397 on the axially movable sleeve 359 described previously, the head 397 having a beveled face 398 which is adapted to engage two of the spring arms 394 to rotate the corresponding shafts 392 into positions to cause the corresponding latches 391 to lock the corresponding vanes 366 in their retracted positions. The head 397 is provided with a diametral crossbar 399 having beveled ends 400 respectively adapted to engage the other two spring arms 394 to operate the other two latches 391 so as to lock the corresponding vanes 366 in their retracted positions. The actuating means 396 is adapted to be operated by moving the sleeve 359 axially, a grooved collar 401 adapted to receive a yoke 402 being fixed on the sleeve for this purpose.

Considering the operation of the actuating means 396, when it is desired to lock two of the vanes 366 in their retracted positions, the sleeve 359 is moved axially toward the inner or driving rotor 351 a distance sufficient to cause the beveled crossbar ends 400 on the head 397 to engage the corresponding two spring arms 394. In the event that the notches 390 in the corresponding vanes 366 are not in registry with the corresponding latches 391 at the instant that the beveled ends 400 actuate the corresponding spring arms 394, such spring arms deflect until the corresponding notches are in registry with the corresponding latches, whereupon the spring arms then rotate the corresponding latches 391 into the corresponding notches 390 to lock the two vanes in question. Further axial movement of the head 397 inwardly toward the driving rotor 351 causes the beveled face 398 to engage the other two spring arms 394, which then locks the other two latchable vanes 366 in their retracted positions in a similar manner. Thus, either two or four of the vanes 366 may be latched in their inoperative positions, or, alternatively, all of the vanes may be permitted to operate. It will be understood that although I have disclosed a means for latching either two or four of the vanes, any desired numbers of the vanes may be so latched without departing from the spirit of the invention. Similarly, the total number of vanes disclosed may be varied.

As will be apparent, control of the ratio of the speeds of the driving and driven rotors 351 and 352 may be obtained by latching different numbers of the vanes in their retracted positions, thus supplementing the action of the control valves 375, which is an important feature. As will be apparent, a very low ratio of the speed of the driven rotor 352 to that of the driving rotor 351 may be obtained by latching all of the latchable vanes 366 in their retracted positions. Also, if desired, all of the vanes may be latched to completely eliminate creeping.

The transmission 350, in addition to the advantages provided by making some of the vanes latchable, has other advantages over the embodiments described previously. In the first place, by forming the pumping chambers 367 and the by-pass passages 368 in the radial space between the driving and driven rotors, it is unnecessary to cast or machine passages through the rotors and, with the exception of the vane guides 369, concentric parts are used throughout, thereby greatly simplifying manufacture. Also, the vane guides are preferably, but not necessarily, circular to further simplify manufacture, the surfaces of the vane guides in the particular construction illustrated being arcs of smaller radius than the radius of the inner periphery of the driven rotor 352.

The embodiment of Fig. 16 is similar to that of Figs. 13 to 15 and identical reference numerals are employed for corresponding components. The principal difference in the embodiment of Fig. 16 is that it includes but one pumping chamber 367 and but one control valve 375, the latter controlling a by-pass passage 405 which connects the ends of the pumping chamber.

It will be noted that the radial dimension 406, or area, of the passage 405 is considerably less than the maximum radial dimension 407, or area, of the pumping chamber 367. Consequently, with the single control valve 375 open and no load or a small load on the driven rotor 352, the speed of the driven rotor exceeds that of the driving rotor 351 to provide an overdrive effect because a larger volume of fluid is delivered to the passage 405 than it is capable of conducting. Also, this effect is attained without power loss because fluid friction is applied to the driven rotor as hereinbefore discussed. Similar results may be attained with previously described embodiments by similarly relating the radial dimensions of the pumping chambers and the interconnecting passages thereof, these radial dimensions actually being so related in the embodiment of Figs. 13 to 15 so that the same effect is attained therewith.

In all other respects, the operation of the embodiment of Fig. 16 is similar to that of the embodiment of Figs. 13 to 15. As in the latter embodiment, all of the vanes may be latched to completely eliminate creeping of the driven rotor and any apparatus, such as an automobile, driven thereby.

Although I have disclosed various exemplary embodiments of my invention for purposes of illustration, it will be understood that various changes, modifications and substitutions may be incorporated in such embodiments without necessarily departing from the spirit of the invention and that, therefore, the invention is not to be regarded as limited specifically thereto.

I claim as my invention:

1. In a hydraulic transmission, the combination of: driving and driven rotors providing therebetween a space for a liquid and providing an outlet passage which communicates with said space, the maximum cross-sectional area of said space exceeding the maximum cross-sectional area of said passage; a plurality of vanes carried by said driving rotor and adapted to traverse said space, whereby said vanes tend to discharge liquid from said space through said outlet passage upon rotation of said driving rotor relative to said driven rotor; and a valve carried by said driven rotor and controlling the rate of discharge of liquid from said space through said outlet passage, said valve being pivoted on said driven rotor and having unequal areas on opposite sides of its pivot axis, pressure in said space against the smaller of said areas biasing said valve closed and pressure in said space against the larger of said areas biasing said valve open.

2. In a hydraulic transmission, the combination of: a pump of the generally radially movable vane type comprising a member having an inlet and an outlet and comprising a rotor which carries generally radially movable vanes engageable with said member and adapted to pump liquid from said inlet to said outlet; selectively actuable latch means for latching at least some of said vanes in retracted positions; selector means for selectively actuating said latch means; means for mounting said member for rotation about the axis of rotation of said rotor; a by-pass passage connecting said inlet to said outlet so as to shortcircuit said pump; and a valve in said by-pass passage for controlling the rate of flow of liquid from said outlet to said inlet.

3. In a hydraulic transmission, the combination of: nested driving and driven rotors providing therebetween at least one circumferentially extending pumping chamber and providing at least one by-pass passage interconnecting the ends thereof; a plurality of radially movable vanes carried by said driving rotor and extending generally radially into engagement with said driven rotor and adapted to traverse said pumping chamber, whereby said vanes tend to discharge liquid from said pumping chamber through said by-pass passage upon rotation of said driving rotor relative to said driven rotor, whereby to tend to rotate said driven rotor; selectively actuable latches carried by said driving rotor and engageable with selected ones of said vanes, respectively, for holding such vanes in retracted positions; and selector means operatively connected to said latches for selectively actuating same.

4. A hydraulic transmission as defined in claim 3 including control valve means for opening and closing said by-pass passage, said control valve means being carried by one of said rotors.

5. A hydraulic transmission according to claim 3 wherein the maximum cross-sectional area of said pumping chamber exceeds the maximum cross-sectional area of said by-pass passage.

6. In a hydraulic transmission, the combination of: a cylindrical driving rotor carrying a plurality of radially movable vanes; a driven rotor encompassing said driving rotor and rotatable about the axis thereof, said driven rotor having therein a cylindrical pumping chamber which is traversable by said vanes and which is tangent to said driving rotor at one point, said driven rotor also having therein a cylindrical recess which is tangent to said pumping chamber at a point substantially diametrically opposite the point of tangency of said pumping chamber to said driving rotor, said pumping chamber being of greater diameter than said driving rotor and said recess being of greater diameter than said pumping chamber so as to provide between the peripheral wall of said recess and the peripheral wall of said driving rotor a by-pass passage through which fluid may flow from one side of said pumping chamber to the other; and a valve in said by-pass passage for controlling the rate of flow therethrough.

7. In a hydraulic transmission, the combination of: driving and driven rotors providing a space for a liquid and providing an outlet passage which communicates with said space; a plurality of vanes carried by said driving rotor and adapted to traverse said space, whereby said vanes tend to discharge liquid from said space through said outlet passage upon rotation of said driving rotor relative to said driven rotor; and a valve carried by said driven rotor and controlling the rate of discharge of liquid from said space through said outlet passage, said valve being pivoted on said driven rotor and having unequal areas on opposite sides of its pivot axis, pressure in said space against the smaller of said areas biasing said valve closed and pressure in said space against the larger of said areas biasing said valve open.

8. In an apparatus of the character described, the combination of: a pump of the generally radially movable vane type comprising a member having an inlet and an outlet and comprising a rotor which carries generally radially movable vanes engageable with said member and adapted to pump liquid from said inlet to said outlet; selectively actuable latch means for latching at least some of said vanes in retracted positions; and selector means for selectively actuating said latch means.

References Cited in the file of this patent

UNITED STATES PATENTS

| | | |
|---|---|---|
| 693,271 | Harding | Feb. 11, 1902 |
| 952,433 | Levavasseur | Mar. 15, 1910 |
| 1,186,132 | Rich | June 6, 1916 |
| 1,186,661 | Kettler | June 13, 1916 |
| 2,052,429 | Tyler | Aug. 25, 1936 |
| 2,309,119 | Kasch | Jan. 26, 1943 |

FOREIGN PATENTS

| | | |
|---|---|---|
| 395,611 | France | Jan. 4, 1909 |